US010439225B2

(12) United States Patent
Choi et al.

(10) Patent No.: US 10,439,225 B2
(45) Date of Patent: Oct. 8, 2019

(54) LITHIUM ELECTRODE AND LITHIUM BATTERY INCLUDING SAME

(71) Applicant: LG CHEM, LTD., Seoul (KR)

(72) Inventors: Junghun Choi, Daejeon (KR); Minchul Jang, Daejeon (KR); Kiyoung Kwon, Daejeon (KR); Byoungkuk Son, Daejeon (KR); Seong Ho Lee, Daejeon (KR); Intae Park, Daejeon (KR); Changhun Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 277 days.

(21) Appl. No.: 15/318,301

(22) PCT Filed: Jun. 15, 2015

(86) PCT No.: PCT/KR2015/006021
§ 371 (c)(1),
(2) Date: Dec. 12, 2016

(87) PCT Pub. No.: WO2015/190897
PCT Pub. Date: Dec. 17, 2015

(65) Prior Publication Data
US 2017/0117551 A1    Apr. 27, 2017

(30) Foreign Application Priority Data

Jun. 13, 2014  (KR) .................. 10-2014-0072249
Oct. 29, 2014  (KR) .................. 10-2014-0147909

(51) Int. Cl.
*H01M 4/62*   (2006.01)
*H01M 4/134*  (2010.01)
(Continued)

(52) U.S. Cl.
CPC .......... *H01M 4/628* (2013.01); *H01M 4/133* (2013.01); *H01M 4/134* (2013.01); *H01M 4/382* (2013.01);
(Continued)

(58) Field of Classification Search
CPC ....... H01M 8/1039; H01M 2300/0082; H01M 8/1048
See application file for complete search history.

(56) References Cited

U.S. PATENT DOCUMENTS 6,528,212 B1    3/2003   Kusumoto et al.
2002/0102455 A1  8/2002  Daroux et al.
(Continued)

FOREIGN PATENT DOCUMENTS

JP    2004-134403 A    4/2004
JP    2009-76433 A     4/2009
(Continued)

OTHER PUBLICATIONS

Dollé et al., "Live Scanning Electron Microscope Observations of Dendritic Growth in Lithium/Polymer Cells", Electrochemical and Solid-State Letters, 5 (12) A286-A289 (2002).
(Continued)

*Primary Examiner* — Olatunji A Godo
(74) *Attorney, Agent, or Firm* — Birch, Stewart, Kolasch & Birch, LLP

(57) ABSTRACT

The present application relates to a lithium electrode and a lithium battery including the same.

16 Claims, 3 Drawing Sheets

(51) Int. Cl.
*H01M 4/587* (2010.01)
*H01M 10/052* (2010.01)
*H01M 4/133* (2010.01)
*H01M 4/38* (2006.01)
*H01M 4/40* (2006.01)
*H01M 10/0525* (2010.01)
*H01M 4/02* (2006.01)

(52) U.S. Cl.
CPC .......... *H01M 4/405* (2013.01); *H01M 4/587* (2013.01); *H01M 4/62* (2013.01); *H01M 10/052* (2013.01); *H01M 10/0525* (2013.01); *H01M 2004/027* (2013.01)

(56) References Cited

U.S. PATENT DOCUMENTS

| | | |
|---|---|---|
| 2002/0187401 A1 | 12/2002 | Lee et al. |
| 2004/0072066 A1 | 4/2004 | Cho et al. |
| 2004/0209159 A1 | 10/2004 | Lee et al. |
| 2005/0095504 A1 | 5/2005 | Kim et al. |
| 2005/0196677 A1* | 9/2005 | Lee ............... H01M 2/145 429/309 |
| 2007/0065719 A1* | 3/2007 | Timonov .......... H01M 4/137 429/213 |
| 2009/0061325 A1 | 3/2009 | Odani et al. |
| 2009/0148773 A1 | 6/2009 | Volkov et al. |
| 2010/0178545 A1 | 7/2010 | Pan et al. |
| 2012/0276459 A1 | 11/2012 | Im et al. |
| 2013/0029249 A1* | 1/2013 | Hamrock .......... C07C 315/04 429/492 |
| 2013/0130115 A1 | 5/2013 | Park et al. |
| 2014/0205917 A1 | 7/2014 | Mizuno |
| 2016/0056501 A1 | 2/2016 | Ryu et al. |
| 2016/0233475 A1 | 8/2016 | Son et al. |

FOREIGN PATENT DOCUMENTS

| | | |
|---|---|---|
| JP | 2011-174032 A | 9/2011 |
| JP | 2013-114882 A | 6/2013 |
| KR | 1999-004383 A | 1/1999 |
| KR | 2002-0013634 A | 2/2002 |
| KR | 10-2004-0090561 A | 10/2004 |
| KR | 10-2005-0041661 A | 5/2005 |
| KR | 10-2006-0026203 A | 3/2006 |
| KR | 10-2007-0016431 A | 2/2007 |
| KR | 10-2009-0118089 A | 11/2009 |
| KR | 10-2012-0122674 A | 11/2012 |
| KR | 10-2013-0056668 A | 5/2013 |
| KR | 10-2013-0098234 A | 9/2013 |
| KR | 10-2013-0123142 A | 11/2013 |
| KR | 10-2014-0018052 A | 2/2014 |
| KR | 10-2015-0045361 A | 4/2015 |

OTHER PUBLICATIONS

International Search Report for PCT/KR2015/006021 (PCT/ISA/210) dated Oct. 5, 2015.
International Search Report for PCT/KR2015/006024 (PCT/ISA/210) dated Oct. 5, 2015.
Japanese Office Action in Application No. 2016-571397 dated Jan. 11, 2019.
European Search Report for Appl. No. 15806444.4 dated Dec. 11, 2017.
Office Action issued in U.S. Appl. No. 15/315,818, dated Nov. 2, 2018.

* cited by examiner

[Figure 1]
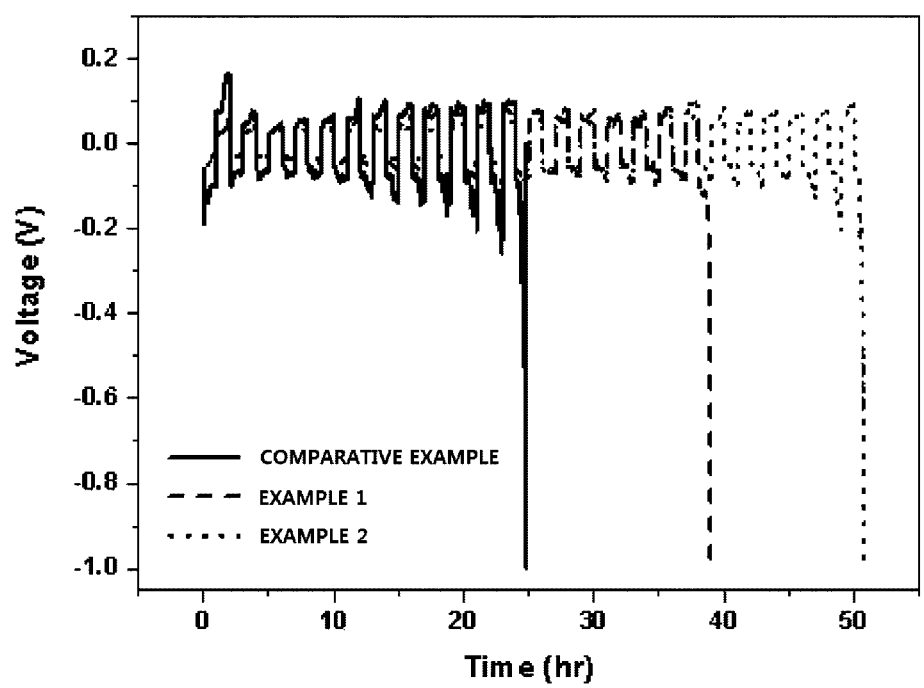

[Figure 2]
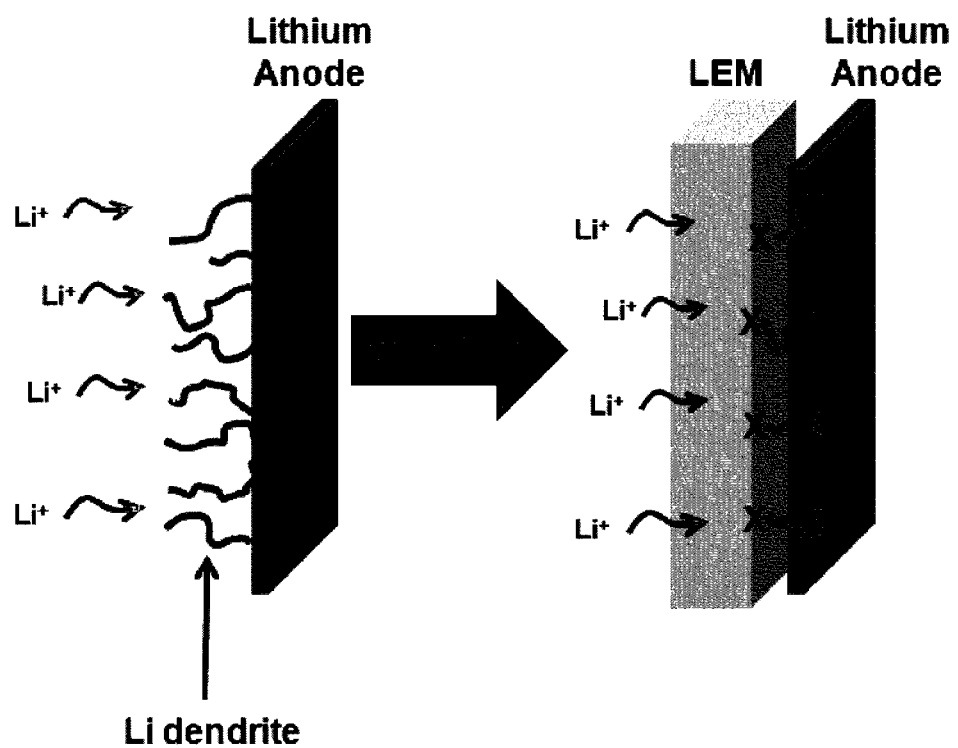

[Figure 3]
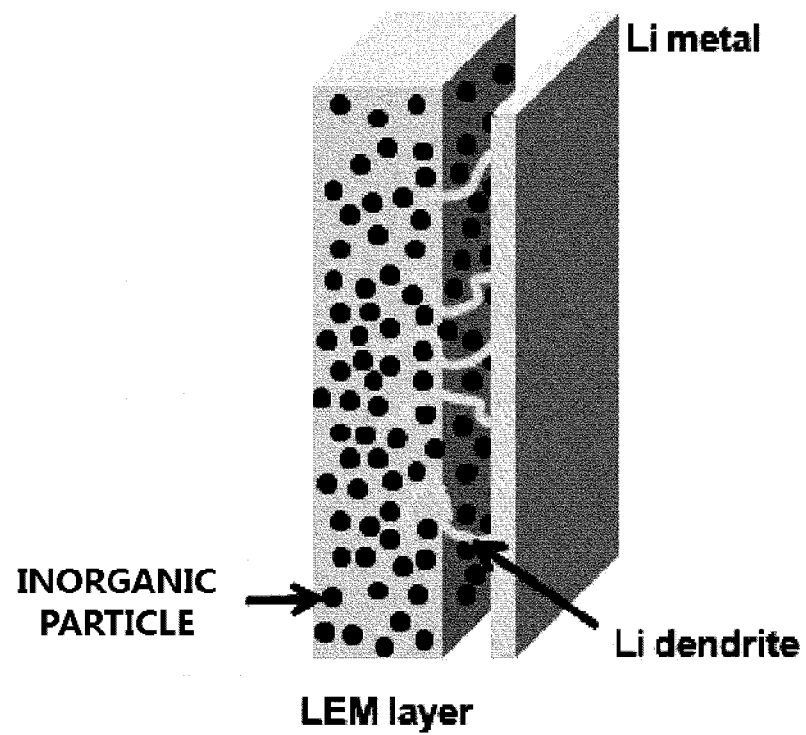

LITHIUM ELECTRODE AND LITHIUM BATTERY INCLUDING SAME

TECHNICAL FIELD

This application claims priority to and the benefit of Korean Patent Application Nos. 10-2014-0072249 and 10-2014-0147909 filed in the Korean Intellectual Property Office on Jun. 13, 2014, and Oct. 29, 2014, respectively, the entire contents of which are incorporated herein by reference.

The present application relates to a lithium electrode and a lithium battery including the same.

BACKGROUND ART

A chemical battery is composed of a positive electrode (anode: a battery negative electrode), a negative electrode (cathode: a battery positive electrode), a separation membrane (separator) for separating the negative electrode and the positive electrode, and an electrolyte for eliminating polarization generated during the electrochemical reaction by helping transfer of charges, and a battery using lithium as a negative electrode is usually referred to as a lithium battery.

Since lithium is a highly reactive metal, a lithium electrode including the lithium has a problem of stability in that it is difficult to deal with the electrode itself in the process.

Further, when a lithium metal is used as an electrode, lithium dendrites are formed in the charge and discharge process, and the dendrites may generate a short circuit of the battery, and the like.

Accordingly, there is a need for research and development on a lithium electrode to simultaneously improve the stability of the lithium electrode and the performance and stability of a lithium battery including the lithium electrode.

DETAILED DESCRIPTION OF THE INVENTION

Technical Problem

The present application has been made in an effort to provide a lithium electrode and a lithium battery including the same.

Technical Solution

In order to solve the problem, the present application provides a lithium electrode including: an electrode layer including lithium; and a protective layer which is provided on at least one surface of the electrode layer and includes a lithium ion conductive polymer including at least one functional group selected from —$SO_3Li$, —COOLi, and —OLi.

Further, the present application provides a lithium battery including the lithium electrode.

Advantageous Effects

A lithium electrode according to an exemplary embodiment of the present application has an effect in that the stability is improved.

The lithium electrode according to an exemplary embodiment of the present application has an effect in that the lithium ion conductivity is improved.

A lithium battery according to an exemplary embodiment of the present application has an effect in that the durability is improved.

The lithium battery according to an exemplary embodiment of the present application has an effect in that lithium dendrites are suppressed from being grown to prevent a short circuit.

The lithium battery according to an exemplary embodiment of the present application has an effect in that the lifetime and stability of the battery are improved.

BRIEF DESCRIPTION OF DRAWINGS

FIG. 1 is a graph obtained by measuring the performances of the cells prepared according to Comparative Example 1, Example 1, and Example 2 of the present application.

FIG. 2 illustrates a lithium electrode in the related art, and a lithium electrode according to an exemplary embodiment of the present application, which includes a protective layer.

FIG. 3 illustrates a lithium electrode according to an exemplary embodiment of the present application, which includes a protective layer further including inorganic particles.

BEST MODE

Hereinafter, the present application will be described in detail.

The present application provides a lithium electrode including: an electrode layer including lithium; and a protective layer which is provided on at least one surface of the electrode layer and includes a lithium ion conductive polymer including at least one functional group selected from —$SO_3Li$, —COOLi, and —OLi.

A lithium electrode according to an exemplary embodiment of the present application has an effect in that the stability of the electrode itself is improved due to a protective layer. Accordingly, there are effects in that the electrode is easily dealt with in the process, and even when the lithium electrode is included in a battery, lithium dendrites are suppressed from being grown to prevent a short circuit. Furthermore, the lifetime and stability of the battery may be improved.

FIG. 2 illustrates a lithium electrode in the related art, and a lithium electrode according to an exemplary embodiment of the present application, which includes a protective layer.

As illustrated in FIG. 2, lithium dendrites are generated generally during the charge and discharge process of the battery, and when a protective layer is applied, it is possible to enhance the charge and discharge efficiency by physically blocking lithium dendrites from being grown. X in the following FIG. 2 schematically illustrates that lithium dendrites fail to be physically grown due to the protective layer.

According to an exemplary embodiment of the present application, the lithium ion conductive polymer may include a repeating unit represented by the following Chemical Formula D.

[Chemical Formula D]

In Chemical Formula D,

R is a hydrocarbon group which is unsubstituted or substituted with at least one selected from a group consisting of fluorine, oxygen, nitrogen, and sulfur, X is —SO$_3$Li, —COOLi, or —OLi, and y is 2 to 100,000.

In the present application, the "hydrocarbon group" means a group having a carbon skeleton, and carbon (C) in the carbon skeleton may be replaced with at least one selected from a group consisting of oxygen (O), nitrogen (N), and sulfur (S), and hydrogen (H) may be replaced with halogen, particularly fluorine (F).

According to an exemplary embodiment of the present application, a terminal group of the lithium ion conductive polymer including the repeating unit represented by Chemical Formula D may be selected from hydrogen, a halogen group, a hydroxy group, and an amine group.

The repeating unit represented by Chemical Formula D may have a weight average molecular weight of 500 to 1,000,000, specifically 100,000 to 1,000,000.

According to an exemplary embodiment of the present application, Chemical Formula D may be represented by the following Chemical Formula E.

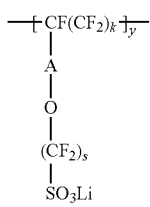
[Chemical Formula E]

In Chemical Formula E,

A is —OCF$_2$CF(CF$_3$)— or a direct bond, k is an integer of 1 to 30, s is an integer of 1 to 10, and y is an integer of 2 to 100,000.

According to an exemplary embodiment of the present application, Chemical Formula E may be represented by the following Chemical Formula E-1, Chemical Formula E-2, Chemical Formula E-3, or Chemical Formula 4.

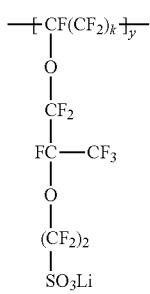
[Chemical Formula E-1]

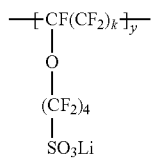
[Chemical Formula E-2]

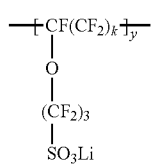
[Chemical Formula E-3]

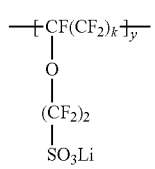
[Chemical Formula E-4]

In Chemical Formulae E-1 to E-4, k and y are the same as those defined in Chemical Formula E.

According to an exemplary embodiment of the present application, the lithium ion conductive polymer may include a copolymer including a repeating unit of the following Chemical Formula A and a repeating unit of the following Chemical Formula B.

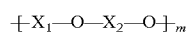
[Chemical Formula A]

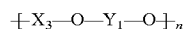
[Chemical Formula B]

In Chemical Formulae A and B, m and n mean the number of repeating units, 1≤m≤500, and 1≤n≤500, X$_1$, X$_2$, and X$_3$ are the same as or different from each other, and are each independently represented by any one of the following Chemical Formulae 1 to 3,

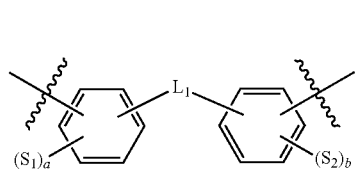
[Chemical Formula 1]

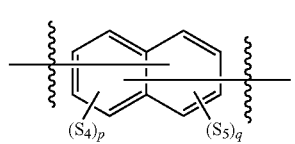
[Chemical Formula 2]

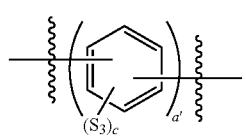
[Chemical Formula 3]

In Chemical Formulae 1 to 3,

L$_1$ is a direct bond, or any one of —CZ$_2$Z$_3$—, —CO—, —O—, —S—, —SO$_2$—, —SiZ$_2$Z$_3$—, and a substituted or unsubstituted divalent fluorene group, Z$_2$ and Z$_3$ are the same as or different from each other, and are each independently any one of hydrogen, an alkyl group, a trifluoromethyl group (—CF$_3$), and a phenyl group, $S_1$ to $S_5$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, a, b, c, p, and q are the same as or different from each other, and are each independently an integer of 0 or more and 4 or less, p+q≤6, a' is an integer of 1 or more and 5 or less, in Chemical Formula B, $Y_1$ is represented by any one of the following Chemical Formulae 4 to 6,

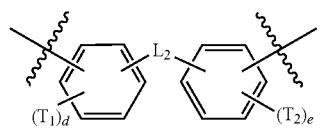
[Chemical Formula 4]

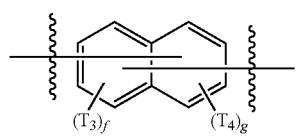
[Chemical Formula 5]

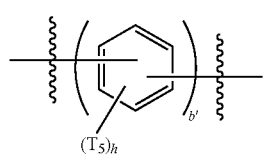
[Chemical Formula 6]

in Chemical Formulae 4 to 6, $L_2$ is a direct bond, or any one selected from —CO—, —SO$_2$—, and a substituted or unsubstituted divalent fluorene group, d, e, f, g, and h are the same as or different from each other, and are each independently an integer of 0 or more and 4 or less, f+g≤6, b' is an integer of 1 or more and 5 or less, $T_1$ to $T_5$ are the same as or different from each other, and each independently, at least one is —SO$_3$Li, —COOLi, or —OLi, and the others are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group.

In the present specification,

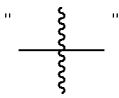

represents a position which may be bonded to an adjacent substituent.

Examples of the substituents will be described below, but are not limited thereto.

In the present specification, examples of the halogen group include fluorine, chlorine, bromine or iodine.

In the present specification, the alkyl group may be straight-chained or branch-chained, and the number of carbon atoms thereof is not particularly limited, but it is preferred that the number is 1 to 60, specifically 1 to 40, and more specifically 1 to 20. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be straight-chained or branch-chained, and the number of carbon atoms thereof is not particularly limited, but it is preferred that the number is 2 to 60, specifically 2 to 40, and more specifically 2 to 20.

In the present specification, the alkoxy group may be straight-chained or branch-chained, and the number of carbon atoms thereof is not particularly limited, but it is preferred that the number is 1 to 60, specifically 1 to 40, and more specifically 1 to 20.

In the present specification, the cycloalkyl group is not particularly limited, but it is preferred that the number of carbon atoms thereof is 3 to 60, specifically 3 to 40, and more specifically 5 to 20, and particularly, a cyclopentyl group and a cyclohexyl group are preferred.

In the present specification, the heterocycloalkyl group includes one or more of S, O, and N and is not particularly limited, but it is preferred that the number of carbon atoms thereof is 2 to 60, specifically 2 to 40, and more specifically 3 to 20, and particularly, a cyclopentyl group and a cyclohexyl group are preferred.

In the present specification, the number of carbon atoms of the amine group is not particularly limited, but it is preferred that the number is 1 to 60, specifically 1 to 40, and more specifically 1 to 20. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group, and the like, but are not limited thereto.

In the present specification, the aryl group may be monocyclic or polycyclic, and the number of carbon atoms thereof is not particularly limited, but it is preferred that the number is 6 to 60, specifically 6 to 40, and more specifically 6 to 20. Specific examples of the aryl group include a monocyclic aromatic group, such as a phenyl group, a biphenyl group, a triphenyl group, a terphenyl group, and a stilbene group, and a polycyclic aromatic group, such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group, and a fluoranthene group, and the like, but are not limited thereto.

In the present specification, the heteroaryl group includes one or more of S, O, and N as a heteroatom, and the number of carbon atoms thereof is not particularly limited, and it is preferred that the number is 2 to 60, specifically 2 to 40, and more specifically 3 to 20. Specific examples of the heteroaryl include pyridyl, pyrrolyl, pyrimidyl, pyridazinyl, furanyl, thienyl, imidazolyl, pyrazolyl, oxazolyl, isoxazolyl, thiazolyl, isothiazolyl, triazolyl, furazanyl, oxadiazolyl, thiadiazolyl, dithiazolyl, tetrazolyl, pyranyl, thiopyranyl, diazinyl, oxazinyl, triazinyl, dioxynyl, triazinyl, tetrazinyl, quinolyl, isoquinolyl, quinazolinyl, isoquinazolinyl, acridinyl, phenanthridinyl, imidazopyridinyl, diazanaphthalenyl, triazaindene, indolyl, benzothiazolyl, benzoxazolyl, benzoimidazolyl, a benzothiophene group, a benzofuran group, a dibenzothiophene group, a dibenzofuran group, carbazolyl, benzocarbazolyl, phenazinyl, and the like, or fused rings thereof, but are not limited thereto.

In the present specification, the fluorenyl group may be substituted with another substituent, and substituents may combine with each other to form a ring. Examples thereof include

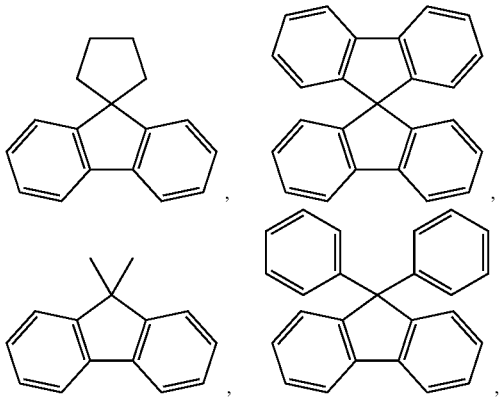

and the like.

In the present specification, the term "substituted or unsubstituted" means being unsubstituted or substituted with one or more substituents selected from a group consisting of deuterium; a halogen group; a nitrile group; a nitro group; a hydroxy group; a cyano group; straight-chained or branch-chained $C_1$ to $C_{60}$ alkyl; straight-chained or branch-chained $C_2$ to $C_{60}$ alkenyl; straight-chained or branch-chained $C_2$ to $C_{60}$ alkynyl; $C_3$ to $C_{60}$ monocyclic or polycyclic cycloalkyl; $C_2$ to $C_{60}$ monocyclic or polycyclic heterocycloalkyl; $C_6$ to $C_{60}$ monocyclic or polycyclic aryl; and $C_2$ to $C_{60}$ monocyclic or polycyclic heteroaryl, or being unsubstituted or substituted with a substituent having a structure in which two or more selected from a group consisting of the substituents above exemplified are linked. As described above, when the substituent has a structure in which two or more substituents are linked, the two or more substituents may be the same as or different from each other.

According to an exemplary embodiment of the present application, m and n may be $2 \leq m \leq 500$ and $2 \leq n \leq 500$.

According to an exemplary embodiment of the present application, the copolymer may be a block copolymer.

In an exemplary embodiment of the present application, the ratio of m and n may be 1:9 to 7:3. That is, when m+n is 1, n may have a ratio of 0.3 to 0.9.

In an exemplary embodiment of the present application, the ratio of m and n may be 2:8 to 6:4. That is, when m+n is 1, n may have a ratio of 0.4 to 0.8.

According to an exemplary embodiment of the present application, Chemical Formula 1 may be represented by the following Chemical Formula 1-1.

[Chemical Formula 1-1]

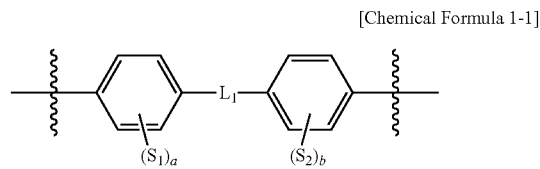

In Chemical Formula 1-1, $S_1$, $S_2$, a, b, and $L_1$ are the same as those defined in Chemical Formula 1.

According to an exemplary embodiment of the present application, Chemical Formula 4 may be represented by the following Chemical Formula 4-1.

[Chemical Formula 4-1]

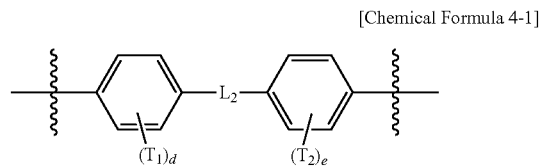

In Chemical Formula 4-1, $T_1$, $T_2$, d, e, and $L_2$ are the same as those defined in Chemical Formula 4.

According to an exemplary embodiment of the present application, in Chemical Formulae A and B, $X_1$, $X_2$, and $X_3$ are the same as or different from each other, and may be each independently any one selected from the following structural formulae.

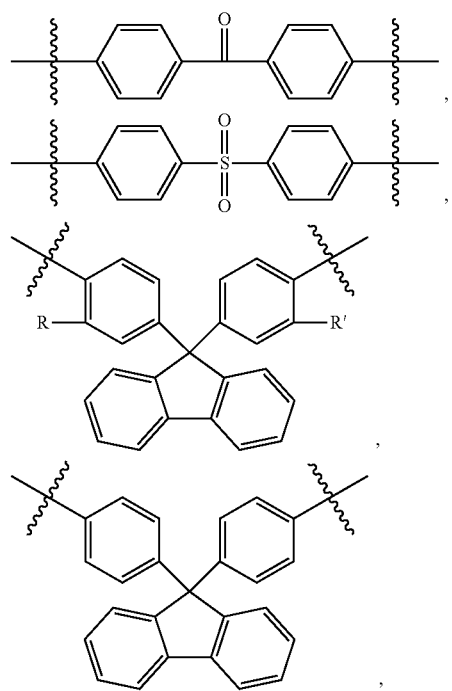

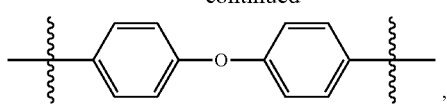,

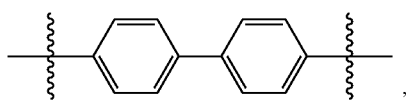,

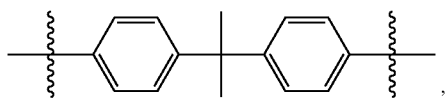,

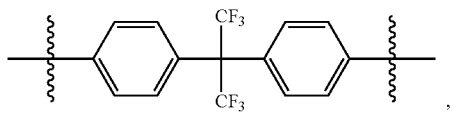,

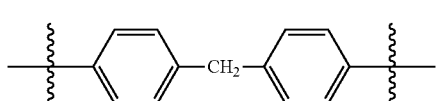,

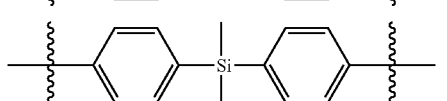,

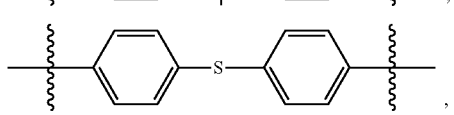,

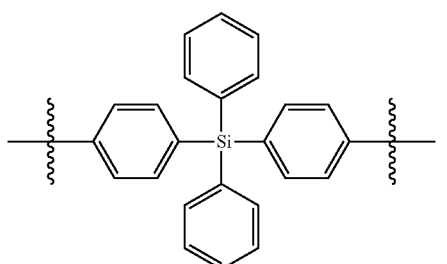,

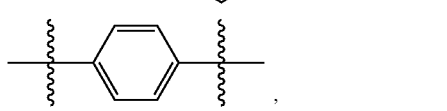,

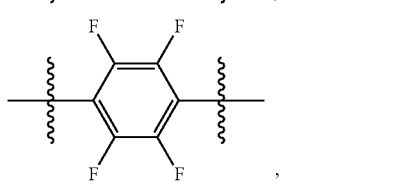,

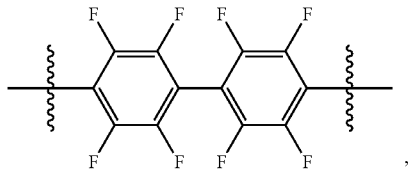,

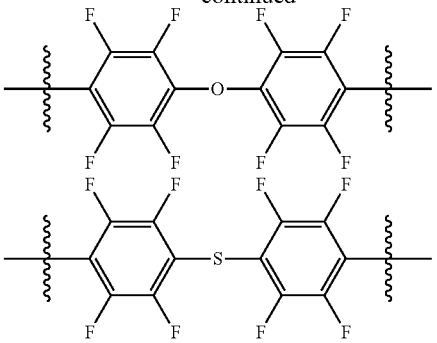

Here, R and R' are the same as or different from each other, and are each independently $-NO_2$ or $-CF_3$.

According to an exemplary embodiment of the present application, in Chemical Formulae A and B, at least one of $X_1$, $X_2$, and $X_3$ may be represented by the following Chemical Formula 11.

[Chemical Formula 11]

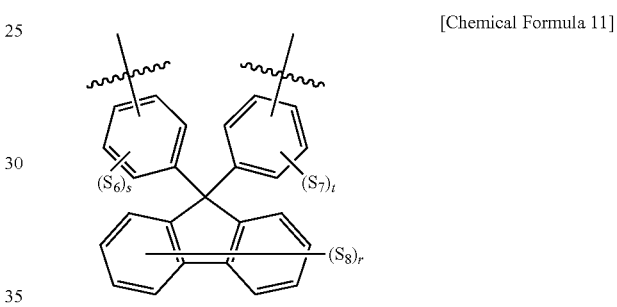

In Chemical Formula 11, $S_6$ to $S_8$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, s and t are the same as or different from each other, and are each independently an integer of 0 or more and 4 or less, and r is an integer of 0 or more and 8 or less.

When the copolymer includes Chemical Formula 11 including a bulky fluorene group, the copolymer may improve the durability while having heat resistance and strong physical properties by a rigid aromatic skeleton, and may exhibit an effect in that lithium ions are easily transferred due to the increase in hydrodynamic volume during the entanglement of polymer chains.

According to an exemplary embodiment of the present application, in Chemical Formulae A and B, at least one of $X_1$ and $X_2$ may be represented by Chemical Formula 11.

According to an exemplary embodiment of the present application, in Chemical Formulae A and B, at least one of $X_1$, $X_2$, and $X_3$ may be

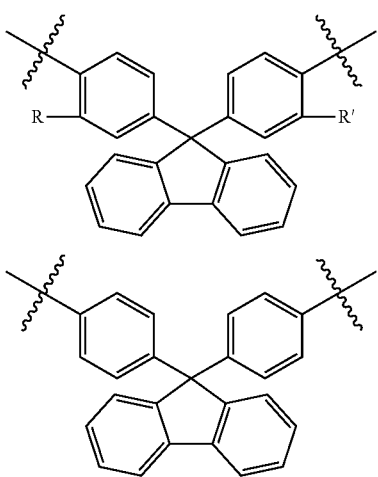
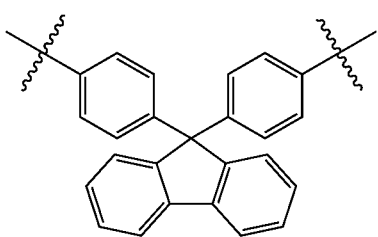
According to an exemplary embodiment of the present application, in Chemical Formula B, $Y_1$ may be any one selected from the following structural formulae.
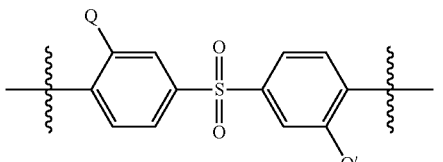
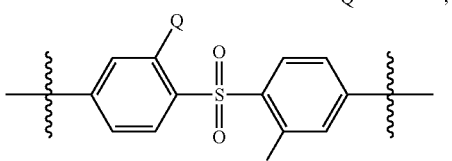
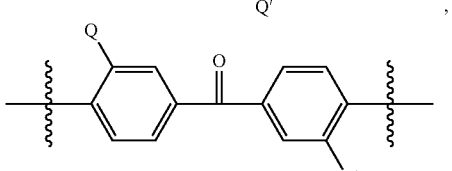
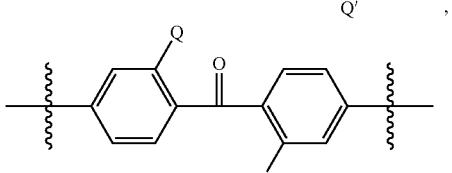
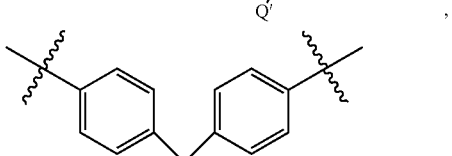
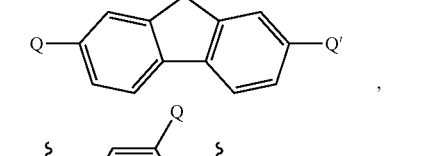
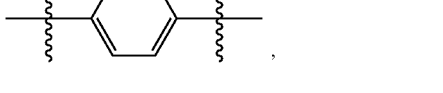
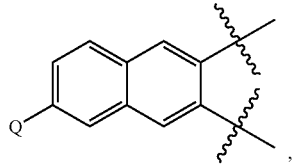
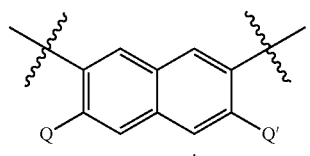
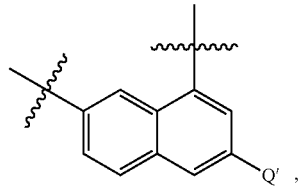
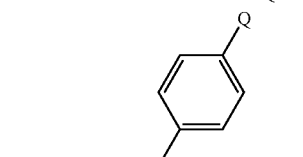
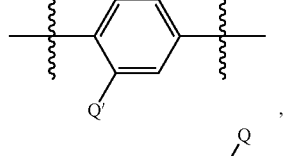
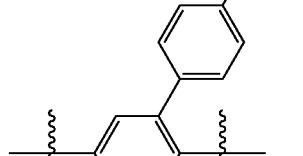
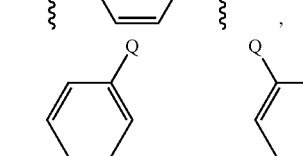
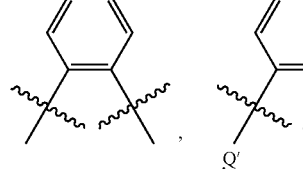
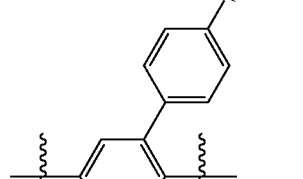
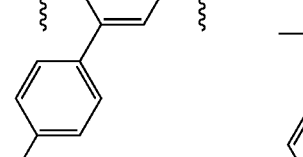

Here, Q is —SO$_3$Li, —COOLi, or —OLi, and Q' is hydrogen, —SO$_3$Li, —COOLi, or —OLi.

According to an exemplary embodiment of the present application, the copolymer may further include a repeating unit of the following Chemical Formula C.

[Chemical Formula C]

According to an exemplary embodiment of the present application, in Chemical Formula C, Z is a trivalent organic group.

According to an exemplary embodiment of the present application, the repeating unit of Chemical Formula C serves to link or cross-link polymer chains as a brancher. Depending on the number of repeating units of Chemical Formula C, a branch may be formed on the chain, or the chains may be cross-linked to each other to form a network-type structure.

According to an exemplary embodiment of the present application, in Chemical Formula C, Z is a trivalent organic group, and may be each bonded to additional repeating units in three directions to elongate the polymer chain.

According to an exemplary embodiment of the present application, the number, molecular weight, and the like of an ion transfer functional group may be adjusted and mechanical properties may be strengthened by using a brancher which is the repeating unit of Chemical Formula C.

According to an exemplary embodiment of the present application, when the number of repeating units in the repeating unit of Chemical Formula C is denoted as k, k may be an integer of 1 to 300.

According to an exemplary embodiment of the present application, the repeating unit of Chemical Formula C may be a polymer repeating unit constituting a main chain. For example, Z may be linked to at least one selected from X$_1$, X$_2$, X$_3$, and Y$_1$ to form one repeating unit. The one repeating unit formed as described above may constitute the main chain. In this case, the number of repeating units is the same as that of the above-described k.

In the present specification, when any two or more selected from Z, X$_1$, X$_2$, X$_3$, and Y$_1$ are bonded to each other, the resulting bonds each have a linking group of oxygen (—O—). The oxygen linking group is a linking group remaining in the chain, from which the compound is left by condensation polymerization. For example, when a dihalogen-based monomer and a diol-based monomer are polymerized, the oxygen linking group may be a case where HF evades and only oxygen (—O—) remains in the chain.

According to an exemplary embodiment of the present application, in Chemical Formula C, Z is represented by the following Chemical Formula C-1 or C-2.

[Chemical Formula C-1]

[Chemical Formula C-2]

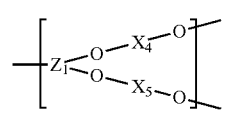

In Chemical Formulae C-1 and C-2,

Z$_1$ may be represented by any one of the following Chemical Formulae 7 to 9.

[Chemical Formula 7]

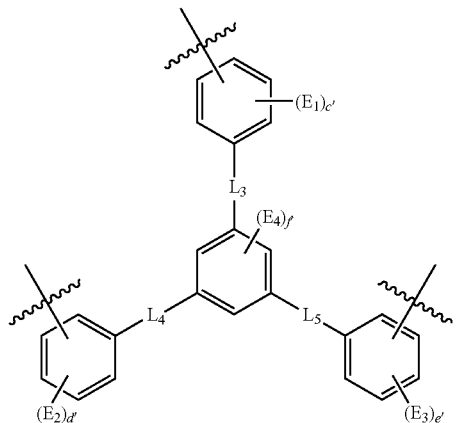

[Chemical Formula 8]

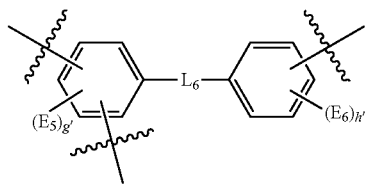

[Chemical Formula 9]

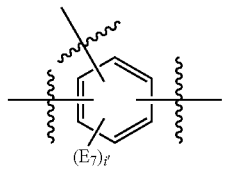

In Chemical Formulae 7 to 9,

L$_3$ to L$_6$ are the same as or different from each other, and are each independently a direct bond, or —O—, —CO—, or —SO$_2$—, E$_1$ to E$_7$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, c', d', e', and h' are the same as or different from each other, and are each independently an integer of 0 or more and 4 or less, f', g', and i' are the same as or different from each other, and are each independently an integer of 0 or more and 3 or less, and X$_4$ and X$_5$ are the same as or different from each other, and are each independently the same as the definition of X$_3$ or Y$_1$ of Chemical Formula B.

According to an exemplary embodiment of the present application, in Chemical Formula C, Z may be any one selected from the following structural formulae.

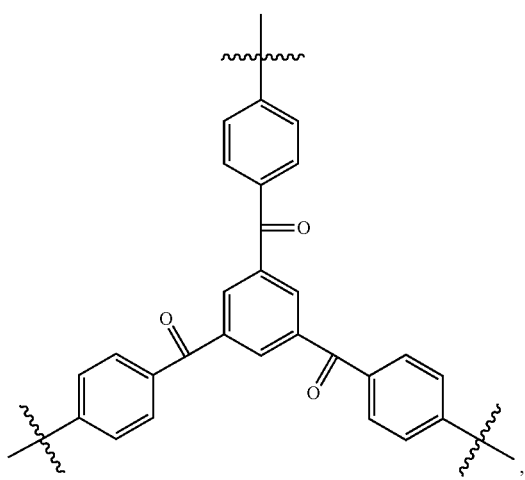

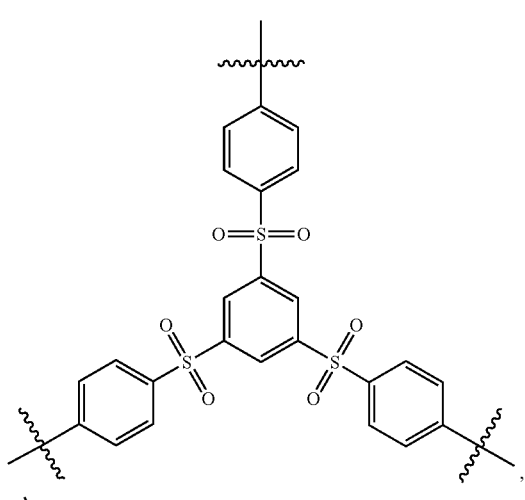

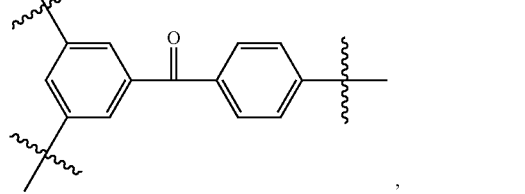

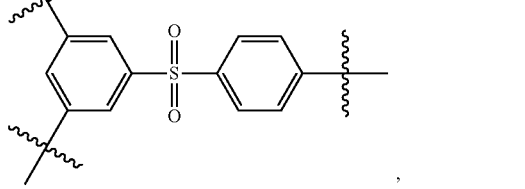

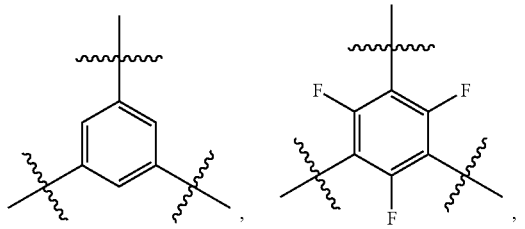

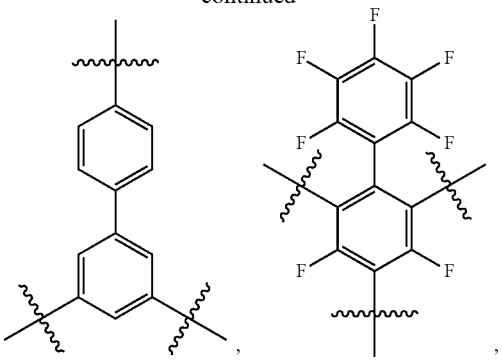

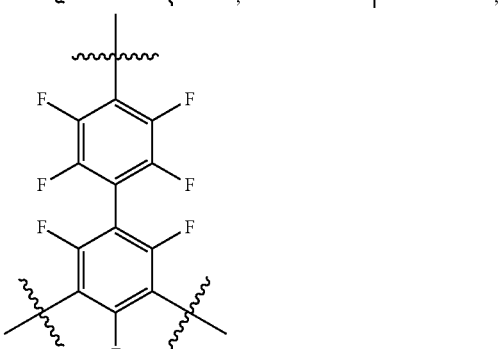

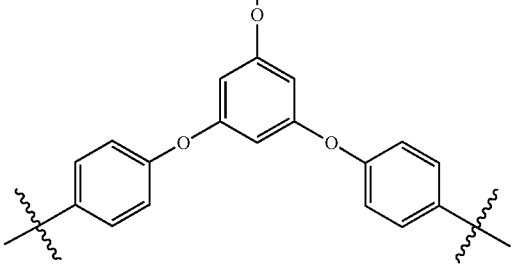

According to an exemplary embodiment of the present application, the repeating unit of Chemical Formula A may be represented by the following structural formula.

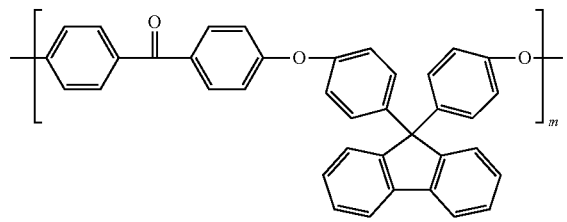

In the structural formula, m is the same as that as described above.

According to an exemplary embodiment of the present application, the repeating unit of Chemical Formula B may be represented by the following structural formulae.

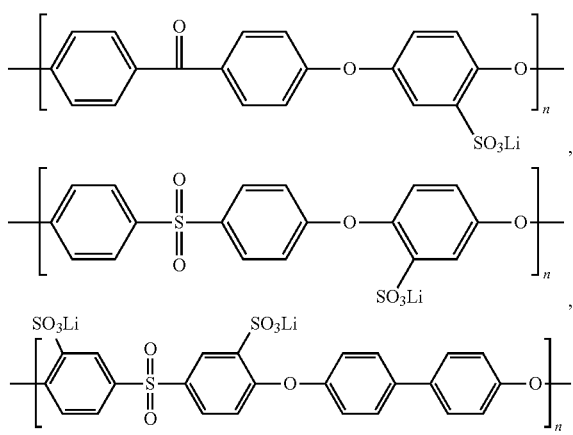

In the structural formulae, n is the same as that as described above.

According to an exemplary embodiment of the present specification, the copolymer may have a weight average molecular weight of 100,000 or more and 1,000,000 or less. When the weight average molecular weight of the copolymer is within the range, an appropriate solubility of the copolymer may be maintained while having mechanical properties as a protective layer.

According to an exemplary embodiment of the present application, the protective layer includes inorganic particles dispersed in the lithium ion conductive polymer.

FIG. 3 illustrates a lithium electrode according to an exemplary embodiment of the present application, which includes a protective layer further including inorganic particles.

The inorganic particles serve to be able to more effectively suppress lithium dendrites from being formed on the surface of the lithium electrode or the formed lithium dendrites from being grown. The inorganic particles may be lithium ion conductive or lithium ion non-conductive.

According to an exemplary embodiment of the present application, examples of the lithium ion non-conductive inorganic particle include a metal oxide such as $Al_2O_3$, $SnO_2$, $CeO_2$, $MgO$, $NiO$, $CaO$, $ZnO$, $ZrO_2$, $Y_2O_3$, $TiO_2$, and SiC, but are not limited thereto.

According to an exemplary embodiment of the present application, examples of the lithium ion conductive inorganic particle include a lithium hybrid-based compound such as $LiBH_4$, $Li_3N$, $Li_2NH$, $Li_2BNH_6$, $Li_{1.8}N_{0.4}Cl_{0.6}$, $Li_3P$—$LiCl$, $Li_4SiO_4$, $Li_3PS_4$, and $Li_3SiS_4$; a thio-LISICON-based compound such as $Li_{10}GeP_2S_{12}$ and $Li_{3.25}Ge_{0.25}P_{0.75}S_4$; a NASICON-based compound such as $Li_{1.3}Al_{0.3}Ge_{1.7}(PO_4)_3$, $Li_{1.3}Al_{0.3}Ti_{1.7}(PO_4)_3$, and $LiTi_{0.5}Zr_{1.5}(PO_4)_3$; a LISICON-based compound such as $Li_{14}Zn(GeO_4)_4$; a Perovskite-based compound such as $Li_{0.35}La_{0.55}TiO_3$, $Li_{0.5}La_{0.5}TiO_3$, and $Li_7La_3Zr_2O_{12}$, and the like, but are not limited thereto.

According to an exemplary embodiment of the present application, the inorganic particle may be a compound of one or more selected from a group consisting of $Al_2O_3$, $SnO_2$, $CeO_2$, $MgO$, $NiO$, $CaO$, $ZnO$, $ZrO_2$, $Y_2O_3$, $TiO_2$, SiC, $LiBH_4$, $Li_3N$, $Li_2NH$, $Li_2BNH_6$, $Li_{1.8}N_{0.4}Cl_{0.6}$, $Li_3P$—$LiCl$, $Li_4SiO_4$, $Li_3PS_4$, $Li_3SiS_4$, $Li_{10}GeP_2S_{12}$, $Li_{3.25}Ge_{0.25}P_{0.75}S_4$, $Li_{1.3}Al_{0.3}Ge_{1.7}(PO_4)_3$, $Li_{1.3}Al_{0.3}Ti_{1.7}(PO_4)_3$, $LiTi_{0.5}Zr_{1.5}(PO_4)_3$, $Li_{14}Zn(GeO_4)_4$, $Li_{0.35}La_{0.55}TiO_3$, $Li_{0.5}La_{0.5}TiO_3$, and $Li_7La_3Zr_2O_{12}$.

According to an exemplary embodiment of the present application, the particle diameter of the inorganic particle is not particularly limited. However, in order to exhibit the dispersibility of the above-described lithium ion conductive polymer and effects of suppressing lithium dendrites from being formed and blocking lithium dendrites from being grown, it is preferred that the inorganic particle has a particle diameter of 1 nm to 10 μm.

According to an exemplary embodiment of the present application, the content of the inorganic particles is not particularly limited because the content may be adjusted in a range where the above-described effects may be sufficiently exhibited depending on the kind of inorganic particle. However, according to exemplary embodiments of the present invention, the inorganic particles may be included in an amount of 10 to 90 parts by weight based on 100 parts by weight of the lithium ion conductive polymer. That is, in order to sufficiently exhibit the effects resulting from including the inorganic particles, it is preferred that the inorganic particles are included in an amount of 10 parts by weight or more based on 100 parts by weight of the lithium ion conductive polymer. However, when the inorganic particles are included in an excessive amount, the lithium ion conductivity may deteriorate, and it may be difficult to secure the performance of a battery including the lithium electrode. Accordingly, it is preferred that the inorganic particles are included in an amount of 90 parts by weight or less based on 100 parts by weight of the lithium ion conductive polymer.

According to an exemplary embodiment of the present application, the protective layer may be provided on at least one surface of the electrode layer.

According to an exemplary embodiment of the present application, the protective layer may be provided on one surface of the electrode layer.

According to an exemplary embodiment of the present application, the protective layer may be provided on both surfaces of the electrode layer.

According to an exemplary embodiment of the present application, the protective layer may be provided in a form which surrounds all the directions of the electrode layer.

According to an exemplary embodiment of the present specification, the protective layer may have a thickness of 0.01 to 50 μm, specifically 0.1 to 50 μm.

According to an exemplary embodiment of the present application, the lithium included in the electrode layer may serve as an active material.

According to an exemplary embodiment of the present application, the lithium included in the electrode layer may be included in a form of a lithium metal; a lithium metal alloy; or a composite of lithium and at least one selected from a group consisting of carbons such as coke, activated carbon, graphite, graphitized carbon, carbon nanotubes, or graphene.

According to an exemplary embodiment of the present application, the lithium metal alloy may be an alloy of lithium and one or more selected from a group consisting of Al, Mg, Si, Sn, B, and Fe.

According to an exemplary embodiment of the present application, the mass ratio of a metal other than lithium in the lithium metal alloy may be 0.1% to 50% compared to lithium.

According to an exemplary embodiment of the present application, the electrode layer may further include at least one of a binder, a solvent, a conductive material, and a dispersant.

According to an exemplary embodiment of the present application, the lithium electrode may be prepared by preparing a slurry by mixing and stirring an active material including lithium, a binder, a solvent, a conductive material, and a dispersant, which are prepared by general methods, coating the slurry on a current collector of a metal material, and then compressing and drying the coated current collector.

According to an exemplary embodiment of the present application, the current collector may use a foil by a combination of copper, nickel, and the like with alloys thereof, and the like. The negative electrode current collector may also increase the adhesive strength of a negative electrode active material by forming fine convex and concave irregularities on the surface thereof, and various forms such as a film, a sheet, a foil, a net, a porous body, a foaming body, and a nonwoven body can be employed.

According to an exemplary embodiment of the present application, the binder is a component which aids in a bonding of a negative electrode active material to a conductive material and a bonding to a negative electrode current collector, and examples thereof include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluorine rubber, various copolymers thereof, and the like.

According to an exemplary embodiment of the present application, the conductive material is a component which further improves conductivity of an electrode active material, the conductive material is not particularly limited as long as the conductive material has conductivity without causing a chemical change to the corresponding battery, and for example, it is possible to use graphite such as natural graphite or artificial graphite; carbon black such as carbon black, acetylene black, Ketjen black, channel black, furnace black, lamp black, and thermal black; conductive fibers such as carbon fiber or metal fiber; metal powder such as carbon fluoride powder, aluminum powder, and nickel powder; conductive whiskers such as zinc oxide and potassium titanate; conductive metal oxides such as titanium oxide; conductive materials such as polyphenylene derivatives, and the like.

Further, the present application provides a lithium battery including the lithium electrode.

According to an exemplary embodiment, the lithium electrode is a negative electrode of a lithium battery.

In general, a battery, which uses lithium as a negative electrode, is referred to as a lithium battery. The lithium battery may be a primary battery, or a secondary battery.

According to an exemplary embodiment, the lithium battery is a lithium secondary battery. Specific examples thereof include a lithium secondary battery, a lithium polymer battery, a lithium sulfur battery, a lithium air battery, and the like.

According to an exemplary embodiment of the present application, the lithium battery includes a positive electrode, a negative electrode, and a separation membrane located between the positive electrode and the negative electrode, and the negative electrode may be the lithium electrode.

According to an exemplary embodiment of the present application, when the lithium electrode is used as a negative electrode of a lithium battery, a surface of the electrode layer on which the protective layer is provided may be in a direction at the positive electrode side.

According to an exemplary embodiment of the present application, the lithium battery includes a positive electrode and a negative electrode, the negative electrode is the lithium electrode, and a surface of the electrode layer on which the protective layer is provided may be in a direction at the positive electrode side. That is, the lithium battery does not include a separation membrane, and the protective layer of the lithium electrode may serve as a separation membrane.

When the lithium electrode according to an exemplary embodiment of the present application is used as a negative electrode of a lithium battery, it is possible to prevent a short circuit of a battery from being generated by suppressing lithium dendrites of the negative electrode from being grown during charge and discharge, and to improve the lifetime and stability of the battery.

According to an exemplary embodiment of the present application, the positive electrode may be prepared in a form in which a positive electrode active material is applied on a positive electrode current collector by a general method. A typical material used as a positive electrode active material of a secondary battery may be applied to the positive electrode active material without limitation, and examples thereof may be $LiCoO_2$, $LiNiO_2$, $LiMnO_2$, $LiMn_2O_4$, $Li(Ni_aCo_bMn_c)O_2$ (a, b, and c are each a number from 0 to 1, and a+b+c=1), $LiFePO_4$, or a mixture of one or more thereof. The positive electrode current collector may be a foil by aluminum, nickel, and the like, and a combination of alloys of one or more thereof, and the like.

According to an exemplary embodiment of the present application, the separation membrane is not particularly limited, and may be in a form of a porous membrane. Specifically, the separation membrane may be a separation membrane formed by using polyethylene, polypropylene, other polyolefin-based membranes, or a multi-layered membrane thereof. Otherwise, the separation membrane may be a separation membrane in which a ceramic coating is applied to the aforementioned separation membrane.

The lithium battery according to an exemplary embodiment of the present application may be prepared by a typical method known in the art, and may be prepared by injecting an electrolytic solution into a cylindrical outer shape, a square outer shape, or a pouch-type outer shape, which is assembled by including the negative electrode, the positive electrode, and the separation membrane. Further, the separation membrane may not be included.

MODE FOR INVENTION

Hereinafter, the present application will be described in more detail through Examples. However, the following Examples are provided for exemplifying the present application, and the scope of the present application is not limited thereby.

<Preparation Example> Preparation of Lithium Ion Conductive Polymer (Preparation of Brancher)

5 g (18.8 mmol) of 1,3,5-benzenetricarbonyl trichloride, 6.7 g (50.0 mmol) of aluminum chloride, and 50 mL of distilled dichloromethane (DCM) were added to a 250 mL round flask, and the resulting mixture was stirred and reacted under nitrogen at a temperature of 25° C. for 30 minutes. And then, 20 mL of dichloromethane and 4.5 g (48.8 mmol) of fluorobenzene were added to a 100 mL dropping funnel, and the fluorobenzene solution was added dropwise to the reactant in the round flask. After the reactant was stirred under a nitrogen atmosphere for 4 hours, 20 mL of distilled water was added thereto, and the reactant was again further stirred for 12 hours or more. The organic layer was extracted from the reactant by using dichloromethane, and then a crude product obtained by removing the organic solvent was recrystallized with ethanol to separate [3,5-bis(4-fluorobenzoyl)phenyl](4-fluorophenyl)methanone which is a white brancher (yield: 70%). The structure of the [3,5-bis(4-fluorobenzoyl)phenyl](4-fluorophenyl)methanone was confirmed by using 1H-NMR, 13C-NMR spectroscopy, an elemental analysis, and the like. 1H-NMR (DMSO-d6): δ (ppm) 8.24 (s, 3H), 7.96 (m, 6H), 7.46 (m, 6H)

(Preparation of Branched Hydrophobic Block)

A Dean-Stark apparatus was connected to a 500 mL round flask, and then 17.238 g (79.00 mmol) of 4,4'-difluorobenzophenone, 1.053 g (2.37 mmol) of [3,5-bis(4-fluorobenzoyl)phenyl](4-fluorophenyl)methanone, 24.502 g (69.92 mmol) of 9,9-bis(4-hydroxyphenyl)fluorene, 19.327 g (139.84 mmol) of potassium carbonate, 200 mL of N-methyl-2-pyrrolidone, and 120 mL of benzene were added thereto. And then, the reaction mixture was stirred under nitrogen at a temperature of 140° C. in an oil bath for 4 hours to completely remove an azotrope adsorbed onto the molecular sieves of the Dean-Stark apparatus by pressurized nitrogen while benzene was backflowed, and then the reaction temperature was warmed to 182° C., 100 mL of N-methyl-2-pyrrolidone was additionally added, and the resulting mixture was subjected to condensation polymerization for 12 hours. After the reaction was terminated, the temperature of the reactant was lowered to 60° C., and then about 200 mL of N-methyl-2-pyrrolidone in the reactant was removed while increasing the temperature of the reactant to 120° C. simultaneously with applying vacuum thereto. And then, the temperature of the reactant was lowered to room temperature, the reactant was diluted by adding 300 mL of methyl tetrahydrofuran (THF) thereto, then the diluted reactant was poured into 3 L of methanol to separate the copolymer from the solvent, and then a copolymer (cake form) obtained by filtration was dried at 80° C. in a vacuum oven for 12 hours or more to prepare 34.8 g of a white branched hydrophobic block, which has a weight average molecular weight of 5,000 g/mol and of which the terminal group was characterized with fluorine elements.

(Preparation of Polyarylene Ether Copolymer Containing Lithium Sulfonate)

13.082 g (2.616 mmol) of the branched hydrophobic block prepared as above, 10.162 g (46.572 mmol) of 4,4'-difluorobenzophenone, 0.93 g (2.093 mmol) of [3,5-bis(4-fluorobenzoyl)phenyl](4-fluorophenyl)methanone, 11.945 g (52.328 mmol) of a lithium salt of hydroquinone sulfonic acid, 14.463 g (104.650 mmol) of potassium carbonate, 200 mL of dimethyl sulfoxide, and 120 mL of benzene were added thereto. And then, the reaction mixture was stirred under nitrogen at a temperature of 140° C. in an oil bath for 4 hours to completely remove an azotrope adsorbed onto the molecular sieves of the Dean-Stark apparatus with pressurized nitrogen while benzene was backflowed, and then the reaction temperature was warmed to 182° C., 100 mL of dimethyl sulfoxide was additionally added, and the resulting mixture was subjected to condensation polymerization for 12 hours. After the reaction was terminated, the reactant was diluted by adding 200 mL of dimethyl sulfoxide to the reactant, then the diluted reactant was poured into 3 L of methanol to separate the copolymer from the solvent, and then a copolymer (cake form) obtained by filtration was dried at 80° C. in a vacuum oven for 12 hours or more to prepare a polyarylene ether copolymer containing lithium sulfonate, in which a branched hydrophobic block and a branched hydrophilic block were alternately linked to each other by chemical bonds. The copolymer had a weight average molecular weight of about 800,000.

Comparative Example 1

A lithium metal having a thickness of 40 μm was composed of a positive electrode and a negative electrode symmetric cell, and polyethylene (PE) and TD2 (an ether-based electrolytic solution) were used as a separation membrane and an electrolytic solution, respectively, thereby preparing a cell.

Example 1

A cell was prepared in the same manner as in the Comparative Example, except that a solution, in which the lithium ion conductive polymer prepared in the Preparation Example was dispersed, was coated on one surface of the lithium metal used as the negative electrode by a doctor blade, and then the coated lithium metal was dried at normal temperature to form a protective layer. In this case, the protective layer had a coating thickness of 10 μm.

Example 2

A cell was prepared in the same manner as in the Comparative Example, except that a solution, in which the lithium ion conductive polymer prepared in the Preparation Example and Al$_2$O$_3$ having a particle diameter of about 500 nm were dispersed at a mass ratio of 10:1, was coated on one surface of the lithium metal used as the negative electrode by a doctor blade, and then the coated metal electrode was dried at normal temperature to form a protective layer. In this case, the protective layer had a coating thickness of 10 μm.

FIG. 2 illustrates a lithium electrode in the related art, and a lithium electrode according to an exemplary embodiment of the present application, which includes a protective layer. For example, Comparative Example 1 may be explained as an example in which the lithium electrode at the left side in FIG. 2 was used as a negative electrode, and Example 1 may be explained as an example in which the lithium electrode at the right side in FIG. 2 was used.

FIG. 3 illustrates a lithium electrode according to an exemplary embodiment of the present application, which includes a protective layer further including inorganic particles. For example, Example 2 may be explained as an example in which the lithium electrode in FIG. 3 was used as a negative electrode.

Experimental Example 1

From the cells prepared in Comparative Example 1, Example 1, and Example 2, the charge and discharge efficiency was measured under the charge and discharge conditions of C-rate: 0.4C and DOD: 40%, and the results are shown in the following FIG. 1 and Table 1.

TABLE 1

| | Comparative Example 1 | Example 1 | Example 2 |
|---|---|---|---|
| Charge and discharge efficiency (%) | 88 | 92.4 | 94.3 |

FIG. 1 is a graph obtained by measuring the performances of the cells prepared according to Comparative Example 1, Example 1, and Example 2 of the present application.

As shown in the following FIG. 1 and the above Table 1, it can be seen that Example 1 in which a lithium ion conductive polymer was coated exhibited higher efficiency by about 4.5% than the Comparative Example, and Example 2 exhibited higher efficiency by about 6.3% than the Comparative Example.

Therefore, a lithium battery including the lithium electrode according to an exemplary embodiment of the present application may high charge and discharge efficiency due to a protective layer including a lithium ion conductive polymer, and a case where inorganic particles are further included in the polymer may exhibit higher charge and discharge efficiency.

The invention claimed is:

1. A lithium electrode comprising:
an electrode layer comprising lithium; and
a protective layer which is provided on at least one surface of the electrode layer and comprises a lithium ion conductive polymer comprising at least one functional group selected from —$SO_3Li$, —COOLi, and —OLi,
wherein the lithium ion conductive polymer comprises a copolymer comprising a repeating unit of the following Chemical Formula A and a repeating unit of the following Chemical Formula B:

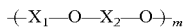   [Chemical Formula A]

   [Chemical Formula B]

in Chemical Formulae A and B,
m and n mean the number of repeating units, $1 \leq m \leq 500$, and $1 \leq n \leq 500$,
$X_1$, $X_2$, and $X_3$ are the same as or different from each other, and are each independently represented by any one of the following Chemical Formulae 1 to 3,

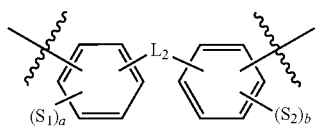   [Chemical Formula 1]

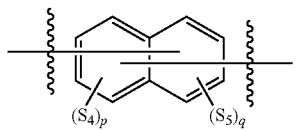   [Chemical Formula 2]

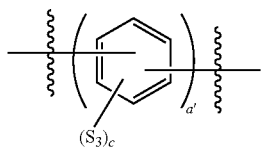   [Chemical Formula 3]

in Chemical Formulae 1 to 3,
$L_1$ is a direct bond, or any one of —$CZ_2Z_3$—, —CO—, —O—, —S—, —$SO_2$—, —$SiZ_2Z_3$—, and a substituted or unsubstituted divalent fluorene group,
$Z_2$ and $Z_3$ are the same as or different from each other, and are each independently any one of hydrogen, an alkyl group, a trifluoromethyl group (—$CF_3$), and a phenyl group,
$S_1$ to $S_5$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group,
a, b, c, p, and q are the same as or different from each other, and are each independently an integer of 0 or more and 4 or less,
$p+q \leq 6$,
a' is an integer of 1 or more and 5 or less,
in Chemical Formula B, $Y_1$ is represented by any one of the following Chemical Formulae 4 to 6,

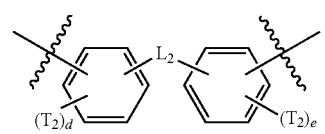   [Chemical Formula 4]

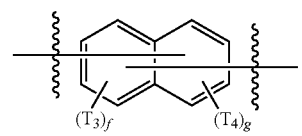   [Chemical Formula 5]

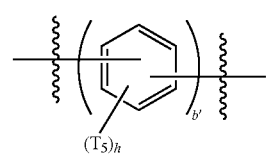   [Chemical Formula 6]

in Chemical Formulae 4 to 6,
$L_2$ is a direct bond, or any one selected from —CO—, —$SO_2$—, and a substituted or unsubstituted divalent fluorene group,
d, e, f, g, and h are the same as or different from each other, and are each independently an integer of 0 or more and 4 or less,
$f+g \leq 6$,
b' is an integer of 1 or more and 5 or less, and
$T_1$ to $T_5$ are the same as or different from each other, and each independently, at least one is —$SO_3Li$, —COOLi, or —OLi, and the others are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group.

2. The lithium electrode of claim 1, wherein $X_1$, $X_2$, and $X_3$ are the same as or different from each other, and are each independently any one selected from the following structural formulae:

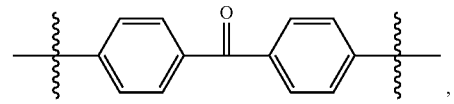

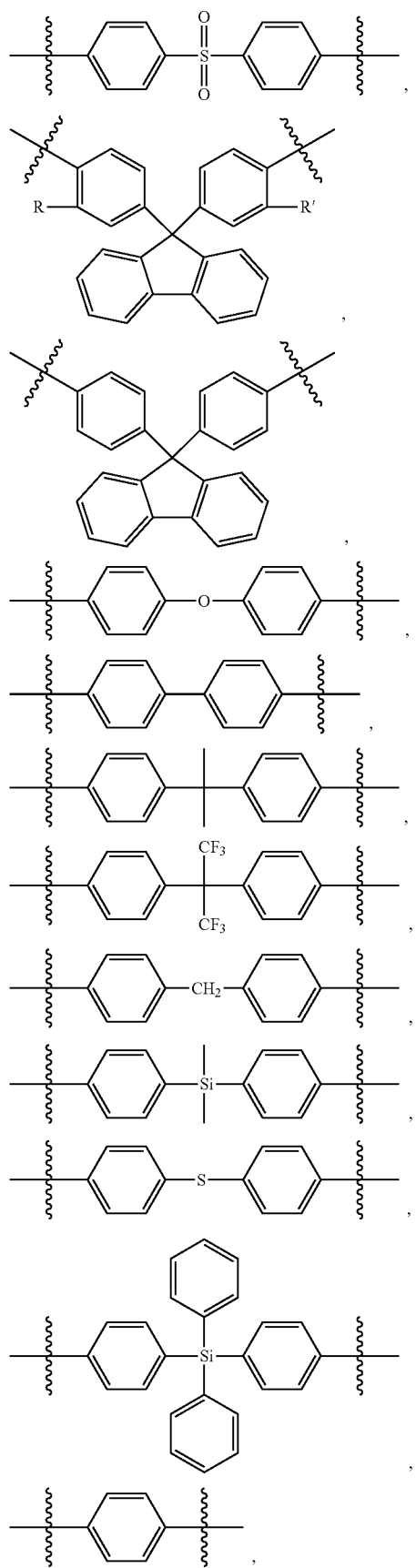
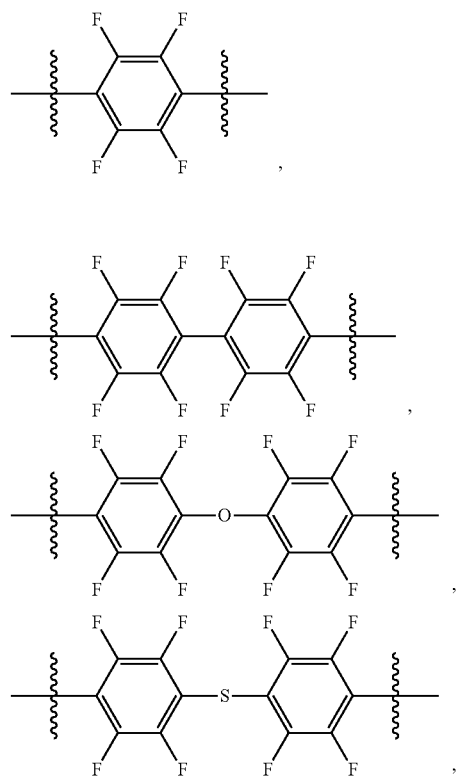
in the structural formulae, R and R' are the same as or different from each other, and are each independently —NO$_2$ or —CF$_3$.
3. The lithium electrode of claim 1, wherein Y$_1$ is any one selected from the following structural formulae:
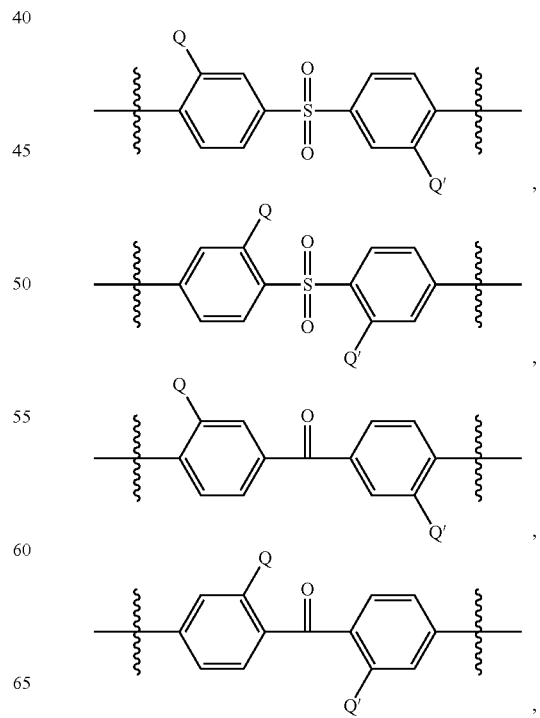

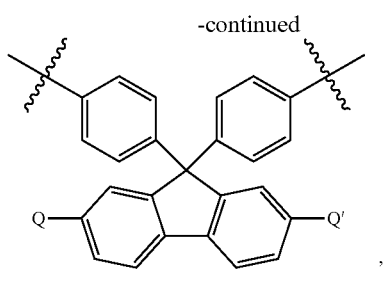

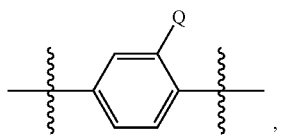

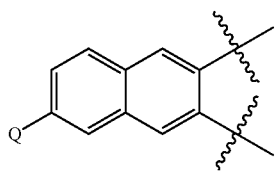

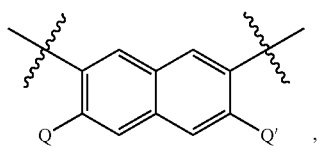

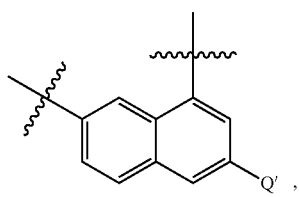

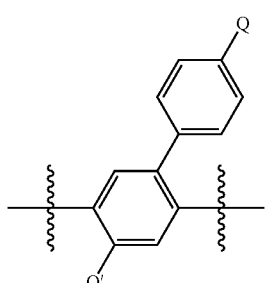

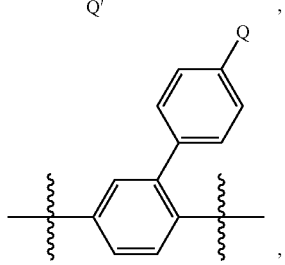

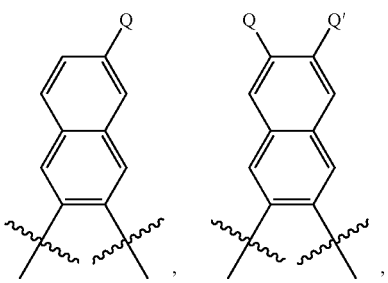

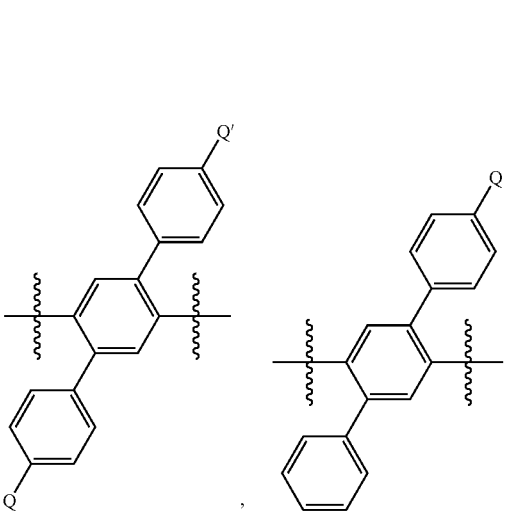

in the structural formulae, Q is —SO$_3$Li, —COOLi, or —OLi, and Q' is hydrogen, —SO$_3$Li, —COOLi, or —OLi.

4. The lithium electrode of claim 1, wherein the copolymer further comprises a repeating unit of the following Chemical Formula C:

[Chemical Formula C]

in Chemical Formula C, Z is a trivalent organic group.

5. The lithium electrode of claim 4, wherein Z is represented by the following Chemical Formula C-1 or C-2:

[Chemical Formula C-1]

[Chemical Formula C-2]

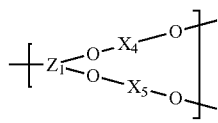

in Chemical Formulae C-1 and C-2,

Z$_1$ is represented by any one of the following Chemical Formulae 7 to 9,

[Chemical Formula 7]

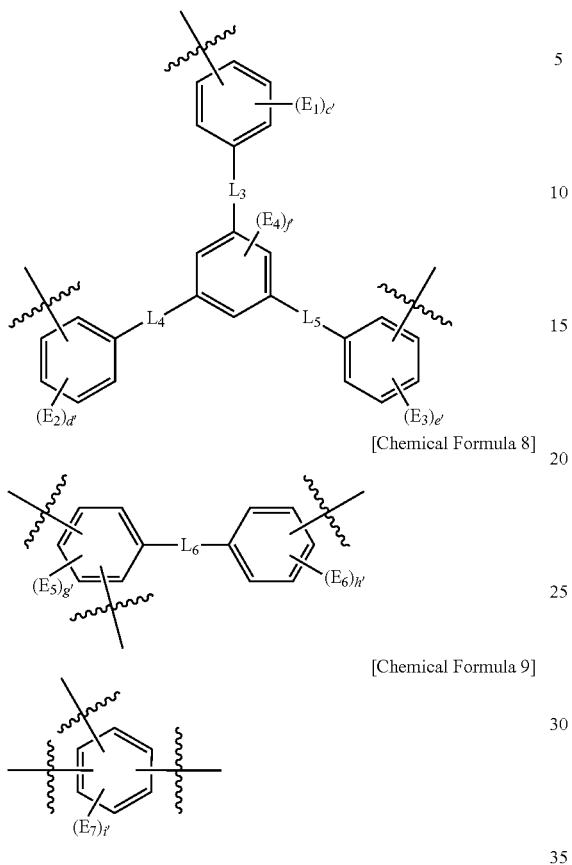

[Chemical Formula 8]

[Chemical Formula 9]

in Chemical Formulae 7 to 9, $L_3$ to $L_6$ are the same as or different from each other, and are each independently a direct bond, or —O—, —CO—, or —SO$_2$—, $E_1$ to $E_7$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted heteroaryl group; a substituted or unsubstituted fluorenyl group; or a substituted or unsubstituted carbazole group, c', d', e', and h' are the same as or different from each other, and are each independently an integer of 0 or more and 4 or less, f', g', and i' are the same as or different from each other, and are each independently an integer of 0 or more and 3 or less, and $X_4$ and $X_5$ are each independently the same as the definition of $X_3$ or $Y_1$ of Chemical Formula B.

6. The lithium electrode of claim 4, wherein $Z_1$ is any one selected from the following structural formulae:

-continued

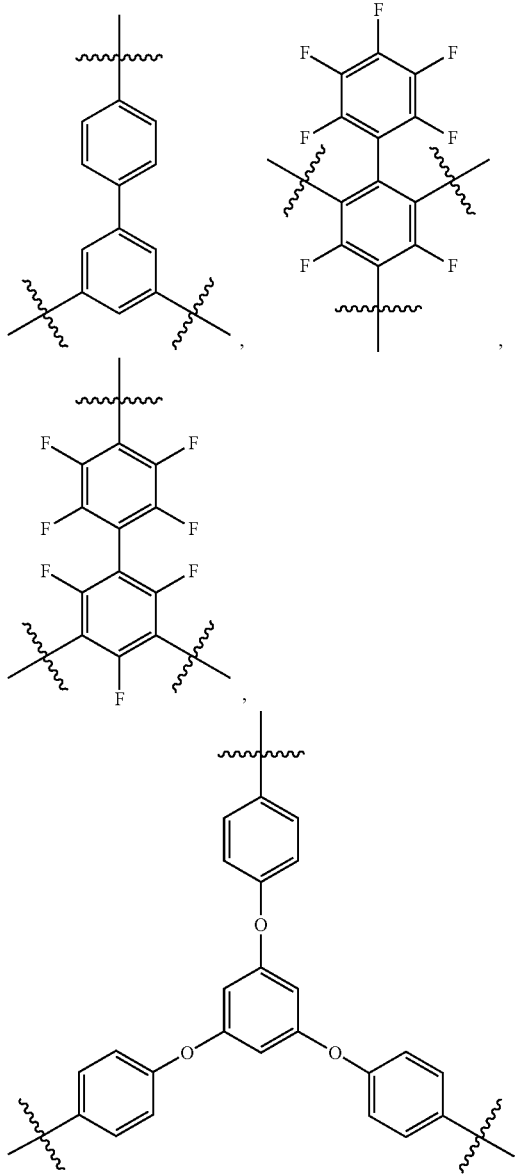

7. The lithium electrode of claim 1, wherein the copolymer has a weight average molecular weight of 100,000 or more and 1,000,000 or less.

8. The lithium electrode of claim 1, wherein the protective layer further comprises inorganic particles dispersed in the lithium ion conductive polymer.

9. The lithium electrode of claim 8, wherein the inorganic particle is a compound of one or more selected from a group consisting of $Al_2O_3$, $SnO_2$, $CeO_2$, MgO, NiO, CaO, ZnO, $ZrO_2$, $Y_2O_3$, $TiO_2$, SiC, $LiBH_4$, $Li_3N$, $Li_2NH$, $Li_2BNH_6$, $Li_{1.8}N_{0.4}Cl_{0.6}$, $Li_3P$—LiCl, $Li_4SiO_4$, $Li_3PS_4$, $Li_3SiS_4$, $Li_{10}GeP_2S_{12}$, $Li_{3.25}Ge_{0.25}P_{0.75}S_4$, $Li_{1.3}Al_{0.3}Ge_{1.7}(PO_4)_3$, $Li_{1.3}Al_{0.3}Ti_{1.7}(PO_4)_3$, $LiTi_{0.5}Zr_{1.5}(PO_4)_3$, $Li_{14}Zn(GeO_4)_4$, $Li_{0.35}La_{0.55}TiO_3$, $Li_{0.5}La_{0.5}TiO_3$, and $Li_7La_3Zr_2O_{12}$.

10. The lithium electrode of claim 8, wherein the inorganic particle has a particle diameter of 1 nm to 10 μm.

11. The lithium electrode of claim 8, wherein the inorganic particles are comprised in an amount of 10 to 90 parts by weight based on 100 parts by weight of the lithium ion conductive polymer.

12. The lithium electrode of claim 1, wherein the protective layer has a thickness of 0.01 to 50 μm.

13. The lithium electrode of claim 1, wherein the lithium comprised in the electrode layer is comprised in a form of a lithium metal; a lithium metal alloy; or a composite of lithium and at least one selected from a group consisting of carbons such as coke, activated carbon, graphite, graphitized carbon, carbon nanotubes, or graphene.

14. The lithium electrode of claim 13, wherein the lithium metal alloy is an alloy of lithium and one or more selected from a group consisting of Al, Mg, Si, Sn, B, and Fe.

15. A lithium battery comprising the lithium electrode of claim 1.

16. The lithium battery of claim 15, wherein the lithium electrode is a negative electrode.

* * * * *